US011133577B2

(12) United States Patent
Wang et al.

(10) Patent No.: US 11,133,577 B2
(45) Date of Patent: Sep. 28, 2021

(54) INTELLIGENT META-STRUCTURE ANTENNAS WITH TARGETED POLARIZATION FOR OBJECT IDENTIFICATION

(71) Applicant: Metawave Corporation, Palo Alto, CA (US)

(72) Inventors: Yan Wang, Palo Alto, CA (US); Maha Achour, Palo Alto, CA (US)

(*) Notice: Subject to any disclaimer, the term of this patent is extended or adjusted under 35 U.S.C. 154(b) by 305 days.

(21) Appl. No.: 16/422,717

(22) Filed: May 24, 2019

(65) Prior Publication Data

US 2019/0363430 A1 Nov. 28, 2019

Related U.S. Application Data

(60) Provisional application No. 62/676,163, filed on May 24, 2018.

(51) Int. Cl.
| | |
|---|---|
| *H01Q 1/32* | (2006.01) |
| *H01Q 21/24* | (2006.01) |
| *G01S 7/02* | (2006.01) |
| *G01S 7/41* | (2006.01) |
| *G01S 13/931* | (2020.01) |
| *G01S 13/00* | (2006.01) |

(52) U.S. Cl.
CPC .......... *H01Q 1/3233* (2013.01); *G01S 7/024* (2013.01); *G01S 7/417* (2013.01); *G01S 13/931* (2013.01); *H01Q 21/24* (2013.01)

(58) Field of Classification Search
None
See application file for complete search history.

(56) References Cited

U.S. PATENT DOCUMENTS

| | | | |
|---|---|---|---|
| 6,043,790 A | 3/2000 | Derneryd et al. | |
| 6,492,949 B1 | 12/2002 | Breglia et al. | |
| 6,768,453 B2 | 7/2004 | Solbach | |
| 7,724,180 B2* | 5/2010 | Yonak | G01S 13/931 342/70 |
| 7,855,696 B2* | 12/2010 | Gummalla | H01Q 1/243 343/876 |
| 8,217,846 B1* | 7/2012 | Buckley | H01Q 21/062 343/730 |
| 8,587,474 B2* | 11/2013 | Fuller | H01Q 15/0086 342/175 |

(Continued)

OTHER PUBLICATIONS

M. Long et al, "Low-RCS Frequency Reconfigurable Antenna With Polarization Conversion Metasurface and Phase Tunable Reflector"; published in the proceedings of the 2017 IEEE International Symposium on Antennas and Propagation; pp. 1921-1922; published by IEEE, Piscataway, NJ, USA, in the year 2017. (Year: 2017).*

(Continued)

*Primary Examiner* — Bernarr E Gregory
(74) *Attorney, Agent, or Firm* — Sandra Lynn Godsey

(57) ABSTRACT

Examples disclosed herein relate to an intelligent meta-structure antenna module for use in a radar for object identification, the module having a first Intelligent Meta-Structure ("iMTS") antenna with a set of slots in a longitudinal direction for horizontal polarization and configured to detect a vehicle, and a second iMTS antenna with a set of slots in a transverse direction for vertical polarization and configured to detect a pedestrian.

20 Claims, 12 Drawing Sheets

(56) References Cited

U.S. PATENT DOCUMENTS

| | | | |
|---|---|---|---|
| 8,803,739 B2 | 8/2014 | Rajgopal et al. | |
| 8,952,858 B2 | 2/2015 | de Rochemont | |
| 9,105,977 B2* | 8/2015 | Seo | H01Q 1/245 |
| 9,545,923 B2* | 1/2017 | Casse | H01Q 15/0086 |
| 10,283,876 B1* | 5/2019 | Livadaru | H01Q 15/0086 |
| 10,942,256 B2* | 3/2021 | Achour | G01S 7/417 |
| 2004/0189527 A1* | 9/2004 | Killen | H01Q 9/0414 343/700 MS |
| 2008/0198082 A1* | 8/2008 | Soler Castany | H01Q 21/24 343/770 |
| 2009/0295660 A1* | 12/2009 | Xu | H01Q 1/243 343/753 |
| 2010/0073232 A1* | 3/2010 | Sajuyigbe | H01Q 21/064 342/372 |
| 2010/0231470 A1* | 9/2010 | Lee | H01Q 15/0086 343/722 |
| 2011/0194551 A1 | 8/2011 | Lee et al. | |
| 2012/0229339 A1* | 9/2012 | Higgins | H01Q 15/0086 342/449 |
| 2015/0222021 A1* | 8/2015 | Stevenson | H01Q 15/0086 343/771 |
| 2016/0087349 A1 | 3/2016 | Lee et al. | |
| 2016/0233588 A1 | 8/2016 | Bily et al. | |
| 2018/0321375 A1* | 11/2018 | Urzhumov | H01Q 15/0066 |
| 2018/0351249 A1* | 12/2018 | Achour | H01Q 1/3233 |

OTHER PUBLICATIONS

D. Patron, "Compact Reconfigurable Antennas for Wireless Systems and Wearable Applications," Ph.D. dissertation, Dept. of Electrical and Computer Eng., Drexel University, Philadelphia, PA, May 2015.

A. B. Guntupalli and K. Wu, "60-GHz Circularly Polarized Antenna Array Made in Low-Cost Fabrication Process," in IEEE Antennas and Wireless Propagation Letters, vol. 13, pp. 864-867, 2014.

J. Ala-Laurinaho, et al., "2-D Beam-Steerable Integrated Lens Antenna System for 5G E-Band Access and Backhaul," in IEEE Transactions on Microwave Theory and Techniques, vol. 64, No. 7, pp. 2244-2255, Jul. 2016.

W. Menzel et al., "A 76 GHz multiple-beam planar reflector antenna," 2002 32nd European Microwave Conference, Milan, Italy, pp. 1-4, Sep. 2002.

W. Menzel, et al., "A 77-GHz FM/CW radar front-end with a low-profile low-loss printed antenna," in IEEE Transactions on Microwave Theory and Techniques, vol. 47, No. 12, pp. 2237-2241, Dec. 1999.

X. Gu et al., "A multilayer organic package with 64 dual-polarized antennas for 28GHz 5G communication," 2017 IEEE MTT-S International Microwave Symposium (IMS), Honololu, Hi, pp. 1899-1901, Jun. 2017.

L.-Y. Ji et al., "A recorfligurable beam-scanning partially reflective surface (PRS) antenna," 2015 9th European conference on Antennas and Propagation (EuCAP), Lisbon, pp. 1-3, Apr. 2015.

A. Erentok et al., "Metamaterial-Inspired Efficient Electrically Small Antennas," in IEEE Transactions on Antennas and Propagation, vol. 56, No. 3, pp. 691-707, Mar. 2008.

H. Lee et al., "A Compact Single Radiator CRLH-Inspired Circularly Polarized Leaky-Wave Antenna Based on Substrate-Integrated Waveguide," in IEEE Transactions on Antennas and Propagation, vol. 63, No. 10, pp. 4566-4572, Oct. 2015.

W. Tian et al., "Analysis of the RCS and radiation pattern of a planar array antenna integrated with dielectric and FSS," Progress in Electromagnetics Research Symposium Proceedings, Xi'an, China, pp. 853-856, Mar. 2010.

Y. J. Guo et al., "Low-cost beamforming employing reconfigurable antennas," 2014 International Workshop on Antenna Technology: Small Antennas, Novel EM Structures and Materials, and Applications (iWAT), Sydney, Australia, pp. 155-158, Mar. 2014.

W. Q. Malik et al., "Angular-spectral antenna effects in ultra-wideband communications links," in IEE Proceedings Communications, vol. 153, No. 1, pp. 99-106, Feb. 2, 2006.

M.W. Rousstia, "Switched-beam antenna array design for millimeter-wave applications," Eindhoven University of Technology (TU/e), Stan Ackermans Institute (SAI), Information and Communication Technology (ICT), Eindhoven, pp. 1-183, Aug. 2011.

J. Schoebel et al., "Planar Antenna Technology for mm-Wave Automotive Radar, Sensing, and Communications," Radar Technology, Guy Kouemou (Ed.), Jan. 2010.

A. Subbarao, et al., Compact Coplanar Waveguide-fed Planar Antenna for Ultra-wideband and WLAN Applications. Wireless Pers. Commun., 71, pp. 2849-2862, 2013.

T. Djerafi et al., "Substrate Integrated Waveguide Antennas," in Handbook of Antenna Technologies, Springer, Singapore, pp. 1-60, Jan. 2015.

* cited by examiner

INTELLIGENT META-STRUCTURE ANTENNAS WITH TARGETED POLARIZATION FOR OBJECT IDENTIFICATION

CROSS-REFERENCE TO RELATED APPLICATIONS

This application claims priority to U.S. Provisional Application No. 62/676,163, filed on May 24, 2018, and incorporated herein by reference in their entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
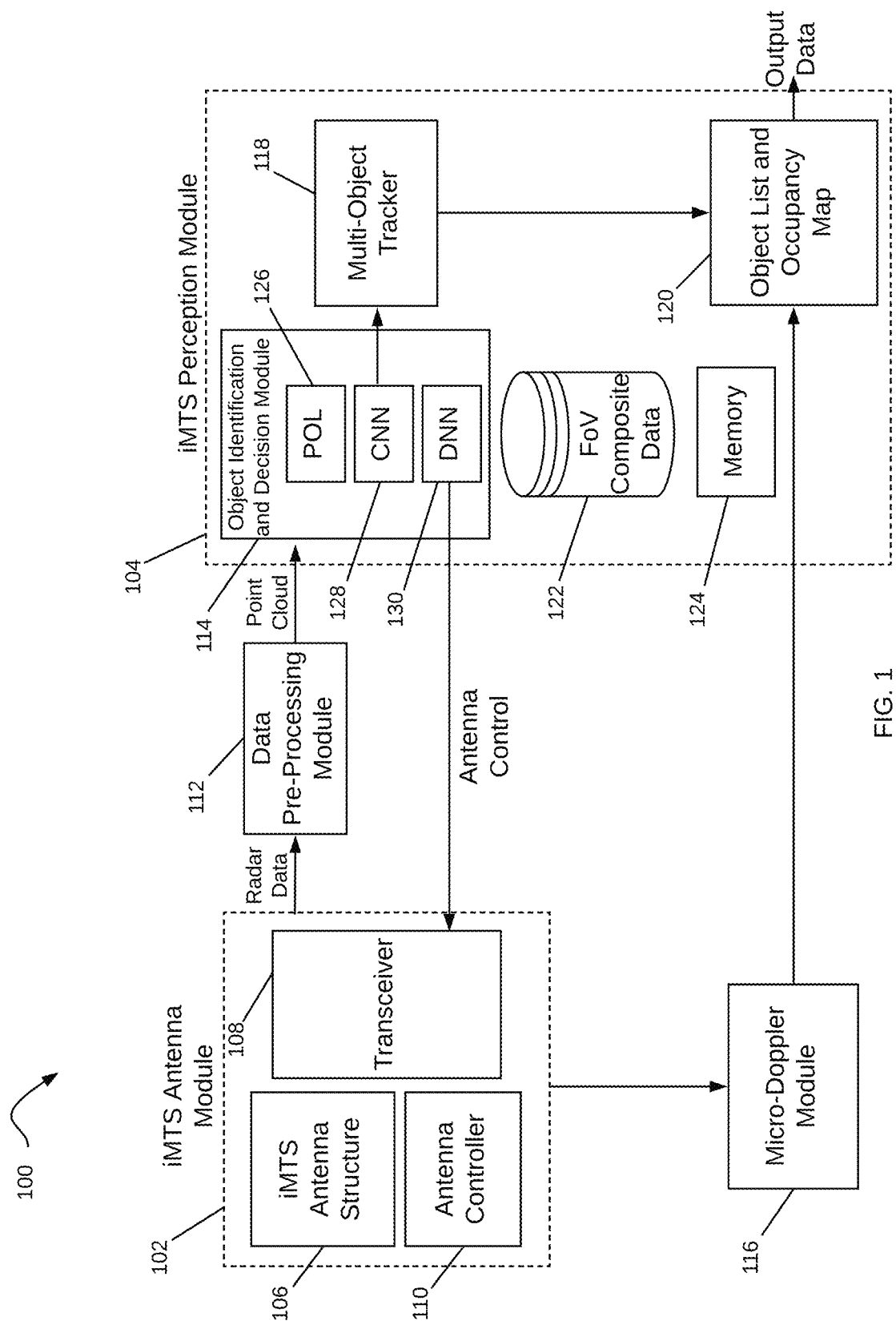
FIG. 1 illustrates a schematic diagram of an iMTS radar system for use in an autonomous driving system in accordance with various examples.

Systems and methods for Intelligent Metamaterial ("iMTS") antennas with targeted polarization for object identification are disclosed. The systems and methods are suitable for many different applications and can be deployed in a variety of different environments and configurations. In various examples, the systems and methods are used in an iMTS radar in an autonomous driving vehicle to detect and identify objects in the vehicle's path and surrounding environment. The iMTS radar has multiple iMTS antennas with polarization that is targeted towards a specific object. The objects may include structural elements in the environment such as roads, walls, buildings, road center medians and other objects, as well as vehicles, pedestrians, bystanders, cyclists, plants, trees, animals and so on. In various examples, an iMTS antenna with horizontal polarization is configured to identify vehicles, while an iMTS antenna with vertical polarization is configured to identify pedestrians. Other iMTS antenna configurations and polarizations may be used for different types of objects.

The iMTS radar is a "digital eye" with true 3D vision and capable of a human-like interpretation of the world. The digital eye and human-like interpretation capabilities are provided by two main modules: an iMTS Antenna Module and an iMTS Perception Module. The iMTS antenna module is based on a dynamically controllable antenna structure with iMTS antenna arrays capable of providing a 360° view of a vehicle's path and surrounding environment. The iMTS perception module receives data from the iMTS antenna module corresponding to a Field of View ("FoV") and is trained to detect and identify objects thereon. The iMTS perception module can also control the iMTS antenna module as desired.

In various examples, the control of the iMTS antenna module may involve changing the electrical or electromagnetic configuration of the iMTS antenna arrays. This may be accomplished, for example, with the use of varactors to enable adjustment of radiation patterns from the antenna arrays in the iMTS antenna module. Each iMTS antenna array is an array of individual antenna elements including intelligent meta-structure cells ("iMTS cells"). A meta-structure, as generally defined herein, is an engineered, non- or semi-periodic structure that is spatially distributed to meet a specific phase and frequency distribution. In some examples, meta-structure cells may be metamaterial ("MTM") cells. In various examples, the iMTS cells may be configured into subarrays that have specific characteristics.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 6:
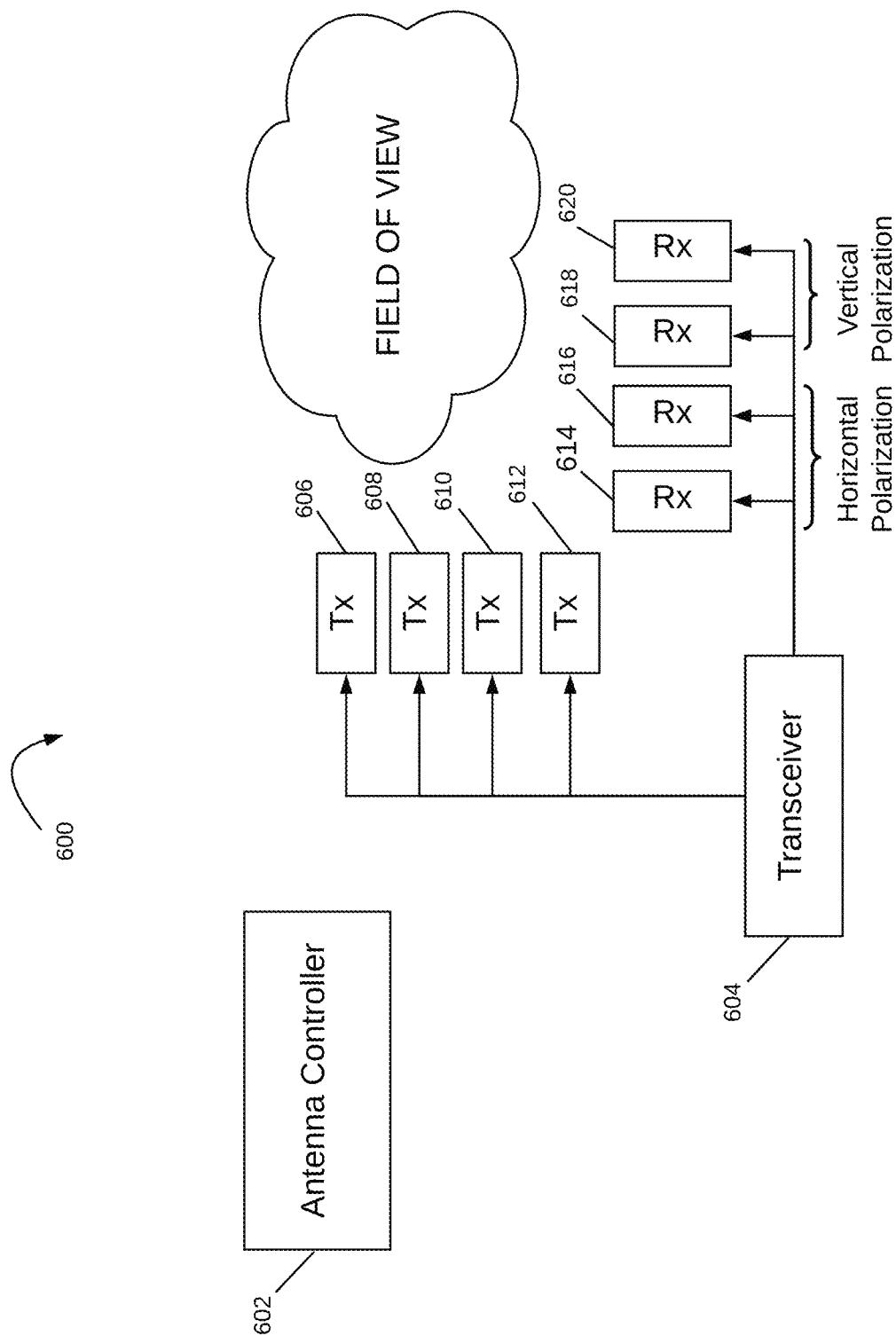
FIG. 6 illustrates a schematic diagram of an iMTS antenna module according to various examples.

FIG. 1 illustrates a schematic diagram of an iMTS radar system for use in an autonomous driving system in accordance with various examples. iMTS radar system 100 is a "digital eye" with true 3D vision and capable of a human-like interpretation of the world. The "digital eye" and human-like interpretation capabilities are provided by two main modules: iMTS Antenna Module 102 and iMTS Perception Module 104.

iMTS antenna module 102 has an iMTS antenna structure 106 to radiate dynamically controllable and highly-directive RF beams using metamaterials. Although a single antenna structure 106 is shown, an iMTS antenna module may have multiple such structures, such as illustrated in FIG. 6 with a set of iMTS transmit antenna structures and a set of iMTS receive antenna structures. A transceiver module 108 coupled to the iMTS antenna structure 106 prepares a signal for transmission, such as a signal for a radar device, wherein the signal is defined by modulation and frequency. The signal is provided to the iMTS antenna structure 106 through a coaxial cable or other connector and propagates through the structure for transmission through the air via RF beams at a given phase, direction, and so on. The RF beams and their parameters (e.g., beam width, phase, azimuth and elevation angles, etc.) are controlled by antenna controller 110, such as at the direction of iMTS perception module 104.

The RF beams reflect off of objects in the vehicle's path and surrounding environment and the RF reflections are received by the transceiver module 108. Radar data from the received RF beams is provided to the iMTS perception module 104 for object detection and identification. A data pre-processing module 112 processes the radar data to encode it into a point cloud for the iMTS perception module 104. In various examples, the data pre-processing module 112 could be a part of the iMTS antenna module 102 or the iMTS perception module 104, such as on the same circuit board as the other modules within the iMTS antenna or perception modules 102-104. The radar data may be organized in sets of Range-Doppler ("RD") map information, corresponding to 4D information that is determined by each RF beam radiated off of objects, such as azimuthal angles, elevation angles, range and velocity. The RD maps may be extracted from Frequency-Modulated Continuous Wave ("FMCW") radar pulses and contain both noise and systematic artifacts from Fourier analysis of the pulses. The iMTS perception module 104 controls further operation of the iMTS antenna module 102 by, for example, providing beam parameters for the next RF beams to be radiated from the iMTS cells in the iMTS antenna structure 106.

In operation, the antenna controller 110 is responsible for directing the iMTS antenna structure 106 to generate RF beams with determined parameters such as beam width, transmit angle, and so on. The antenna controller 110 may, for example, determine the parameters at the direction of iMTS perception module 104, which may at any given time want to focus on a specific area of a FoV upon identifying objects of interest in the vehicle's path or surrounding environment. The antenna controller 110 determines the direction, power, and other parameters of the beams and controls the iMTS antenna structure 106 to achieve beam steering in various directions. The antenna controller 110 also determines a voltage matrix to apply to capacitance control mechanisms coupled to the iMTS antenna structure 106 to achieve a given phase shift. In some examples, the iMTS antenna structure 106 is adapted to transmit a directional beam through active control of the reactance parameters of the individual iMTS cells that make up the iMTS antenna structure 106. iMTS perception module 104 provides control actions to the antenna controller 110 at the direction of the Object Identification and Decision Module 114.

Next, the iMTS antenna structure 106 radiates RF beams having the determined parameters. The RF beams are reflected off of objects in and around the vehicle's path (e.g., in a 360° field of view) and are received by the transceiver module 108 in iMTS antenna module 102. The antenna module 102 then transmits 4D radar data to the data pre-processing module 112 for generating a point cloud that is then sent to the iMTS perception module 104. A micro-doppler module 116 coupled to the iMTS antenna module 102 and the iMTS perception module 104 extracts micro-doppler signals from the 4D radar data to aid in the identification of objects by the iMTS perception module 104. The micro-doppler module 116 takes a series of RD maps from the iMTS antenna module 102 and extracts a micro-doppler signal from them. The micro-doppler signal enables a more accurate identification of objects as it provides information on the occupancy of an object in various directions.

Non-rigid objects such as pedestrians and cyclists are known to exhibit a time-varying doppler signature due to swinging arms, legs, etc. By analyzing the frequency of the returned radar signal over time, it is possible to determine the class of the object (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 116 could be a part of the iMTS antenna module 102 or the iMTS perception module 104, such as on the same circuit board as the other modules within the iMTS antenna or perception modules 102-04.

The object identification and decision module 114 receives the point cloud from the data pre-processing module 112, processes the point cloud to detect and identify objects, and determines the control actions to be performed by the iMTS antenna module 102 based on the detection and identification of such objects. For example, the object identification and decision module 114 may detect a cyclist on the path of the vehicle and direct the iMTS antenna module 102, at the instruction of its antenna controller 110, to focus additional RF beams at a given phase shift and direction within the portion of the FoV corresponding to the cyclist's location.

The iMTS perception module 104 has two neural networks: a deep convolutional neural network ("CNN") 128 and a decision network ("DNN") 130. The iMTS perception module 104 also has a polarization ("POL") module 126 to compare the polarization of received signals and determine the type of object (e.g., pedestrian, vehicle, etc.) based on the polarization. CNN 128 takes in the point cloud from the data pre-processing module 112 and provides output data detecting objects, identifying them (e.g., whether a vehicle, pedestrian, cyclist, wall, etc.), their location, velocity, and other identifying information. Decision network 130 is a Q-learning network that receives the output data from CNN 128 and determines an action for the iMTS antenna module 102 to perform, such as, for example, to steer RF beams to a given direction in the field of view.

In various examples, CNN 128 is a fully convolutional neural network ("FCN") with three stacked convolutional layers from input to output (additional layers may also be included in CNN 128). Each of these layers also performs the rectified linear activation function and batch normalization as a substitute for traditional L2 regularization and includes three filters. As a preliminary step to processing the point cloud from data pre-processing module 112, the point cloud is run through a dynamic threshold. Doing so encodes much higher resolution radar data while still retaining computational efficiency. Objects are shown in the point cloud as voxels, which are values in the multi-dimensional space of the radar data containing range, velocity, azimuth and elevation angles.

The CNN 128 uses small regions of a visual field and identifies edges and orientations in the field, much like a filter for an image. The image goes through a series of convolutional, nonlinear sampling through layers, resulting in a probability. The layers include a convolutional layer that looks at these small regions individually, referred to as receptive fields. The filter process incorporates weights in connections between layers, and when the original information is passed through this layer, the result is a reduced set of data, referred to as a feature map. The feature map identifies objects detected in each receptive field. Note that there may be any number of feature maps as a function of features used in processing. The layers of the CNN 128 detect a first level of features, such as edges. The output of each layer feeds the next layer, which detects a second level of feature, such as a square. At the output of each layer in CNN 128 is a feature map identifying the locations of those features. And as data processes through CNN 128, the layers become more complex to further refine the specific object until the object can be properly identified (e.g., as a pedestrian, cyclist, animal, wall, vehicle, etc.). The final layer of the CNN 128 is a fully connected layer that takes an input feature map and outputs an N-dimensional vector, where N is the number of features or classes. Each number of the N-dimensional vector identifies the probability of each corresponding feature.

It is noted that CNN 128 may incorporate other information to help it identify objects in the vehicle's path and surrounding environment. For example, when an object is moving slowly and outside of a road line, it is likely that the object may be a pedestrian, animal, cyclist, and so on. Similarly, when an object is moving at a high speed, but lower than the average speed of other vehicles on a highway, the CNN 128 may use this information to determine if the object is a bus or a truck, which tend in general to move more slowly. The location of an object, such as in the far-right lane of a highway, may also provide an indication as to whether the object may be a slower-moving type of vehicle. If the movement of the object does not follow the path of a road, then the object may be an animal, such as a deer crossing the road. Further, when polarization module 126 indicates that the polarization of the received radar signals is typically associated with a given type of object, the CNN 128 may use this information from POL 126 to help it discriminate between objects, e.g., to help it differentiate between pedestrians and vehicles. Additional information may also be provided to CNN 128 from a variety of sensors and other information available to the vehicle, including information provided from weather and traffic services, other vehicles or the environment itself, such as smart roads and smart traffic signals. A sensor fusion module (described below with reference to FIG. 12) analyzes all the information available from the sensors to more accurately detect and identify each object.

The output of CNN 128 is sent to DNN 130 so that DNN 130 can determine an action for the iMTS antenna module 102 to perform, such as, for example, to steer RF beams to a given direction in the FoV. In order to select the best action, DNN 130 is trained based on reinforcement learning, a machine learning technique inspired by behavioral psychology. The idea is to have DNN 130 choose an action for a given state such that its reward is maximized. In this case, the state is the output of the CNN 128, the action is a selection of beam parameters for the iMTS antenna module 102 to know where to direct its next beams with the selected parameters (e.g., beam width, direction, etc.), and the reward is the performance of the DNN 130 following the selections.

Training the DNN 130 boils down to indicating to the DNN 130 when it is doing well and when it is doing poorly. For example, reinforcement learning is used to train dogs. You cannot tell the dog what to do, but over time the dog will understand that certain actions lead to more rewards. The rewards are also not the same; some rewards may be more likely or desirable than others. The goal of DNN 130 is then to maximize its expected future reward of an action given a state. Training of DNN 130 is accomplished by teaching the DNN 130 to have the optimal representation of the space of states, actions, and rewards.

In addition to the object identification and decision module 114, the iMTS perception module 104 also includes a multi-object tracker 118 to track the identified objects over time, such as, for example, with the use of a Kalman filter. The multi-object tracker 118 matches candidate objects identified by the object identification and decision module 114 with objects it has detected in previous time windows. By combining information from previous measurements, expected measurement uncertainties, and some physical knowledge, the multi-object tracker 118 generates robust, accurate estimates of object locations.

Information on identified objects over time are then stored at an Object List and Occupancy Map 120, which keeps tracks of objects' locations and their movement over time as determined by the multi-object tracker 118. The tracking information provided by the multi-object tracker 118 and the micro-doppler signal provided by the micro-doppler module 116 are combined to produce an output containing the type of object identified, their location, their velocity, and so on. This information from iMTS radar system 100 is then sent to a sensor fusion module (described in more detail below with reference to FIG. 12) in the vehicle, where it is processed together with information from other sensors in the vehicle.

In various examples, an FoV composite data unit 122 stores information that describes an FoV. This may be historical data used to track trends and anticipate behaviors and traffic conditions or may be instantaneous or real-time data that describes the FoV at a moment in time or over a window in time. The ability to store this data enables the iMTS perception module 104 to make decisions that are strategically targeted at a particular point or area within the FoV. For example, the FoV may be clear (no echoes received) for five minutes, and then one echo arrives from a specific region in the FoV; this is similar to detecting the front of a car. In response, the iMTS perception module 104 may determine to narrow the beam width for a more focused view of that sector or area in the FoV. The next scan may indicate the objects' length or other dimension, and if the object is a car, the iMTS perception module 104 may consider what direction the object is moving and focus the beams on that area. Similarly, the echo may be from a spurious object, such as a bird, which is small and moving quickly out of the path of the car. There are a variety of other uses for the FoV composite data 122, including the ability to identify a specific type of object based on previous detection. A memory 124 stores useful data for iMTS radar system 100, such as, for example, information on which subarrays of the iMTS antenna structure 106 perform better under different conditions.

In various examples described herein, the use of iMTS radar system 100 in an autonomous driving vehicle provides a reliable way to detect objects in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the iMTS radar system 100, the driver (or driverless vehicle) may maintain the maximum safe speed without regard to the weather conditions. Even if other drivers slow down, a vehicle enabled with the iMTS radar system 100 will be able to detect those slow-moving vehicles and obstacles in the way and avoid/navigate around them.

Additionally, in highly congested areas, it is necessary for an autonomous vehicle to detect objects in sufficient time to react and take action. The examples provided herein for an iMTS radar system increase the sweep time of a radar signal so as to detect any echoes in time to react. In rural areas and other areas with few obstacles during travel, the iMTS perception module 104 adjusts the focus of the beam to a larger beam width, thereby enabling a faster scan of areas where there are few echoes. The iMTS perception module 104 may detect this situation by evaluating the number of echoes received within a given time period and making beam size adjustments accordingly. Once an object is detected, the iMTS perception module 104 determines how to adjust the beam focus. This is achieved by changing the specific configurations and conditions of the iMTS antenna structure 106. For example, in one scenario the voltages on the varactors are adjusted. In another scenario, a subset of iMTS unit cells is configured as a subarray. This configuration means that this set may be treated as a single unit, and all the varactors are adjusted similarly. In another scenario, the subarray is changed to include a different number of unit cells, where the combination of iMTS unit cells in a subarray may be changed dynamically to adjust to conditions and operation of the system.

All of these detection scenarios, analysis and reactions may be stored in the iMTS perception module 104 and used for later analysis or simplified reactions. For example, if there is an increase in the echoes received at a given time of day or on a specific highway, that information is fed into the antenna controller 110 to assist in proactive preparation and configuration of the iMTS antenna structure 106. Additionally, there may be some subarray combinations that perform better, such as to achieve a desired result, and this is stored in the memory 124.

Figure 2:
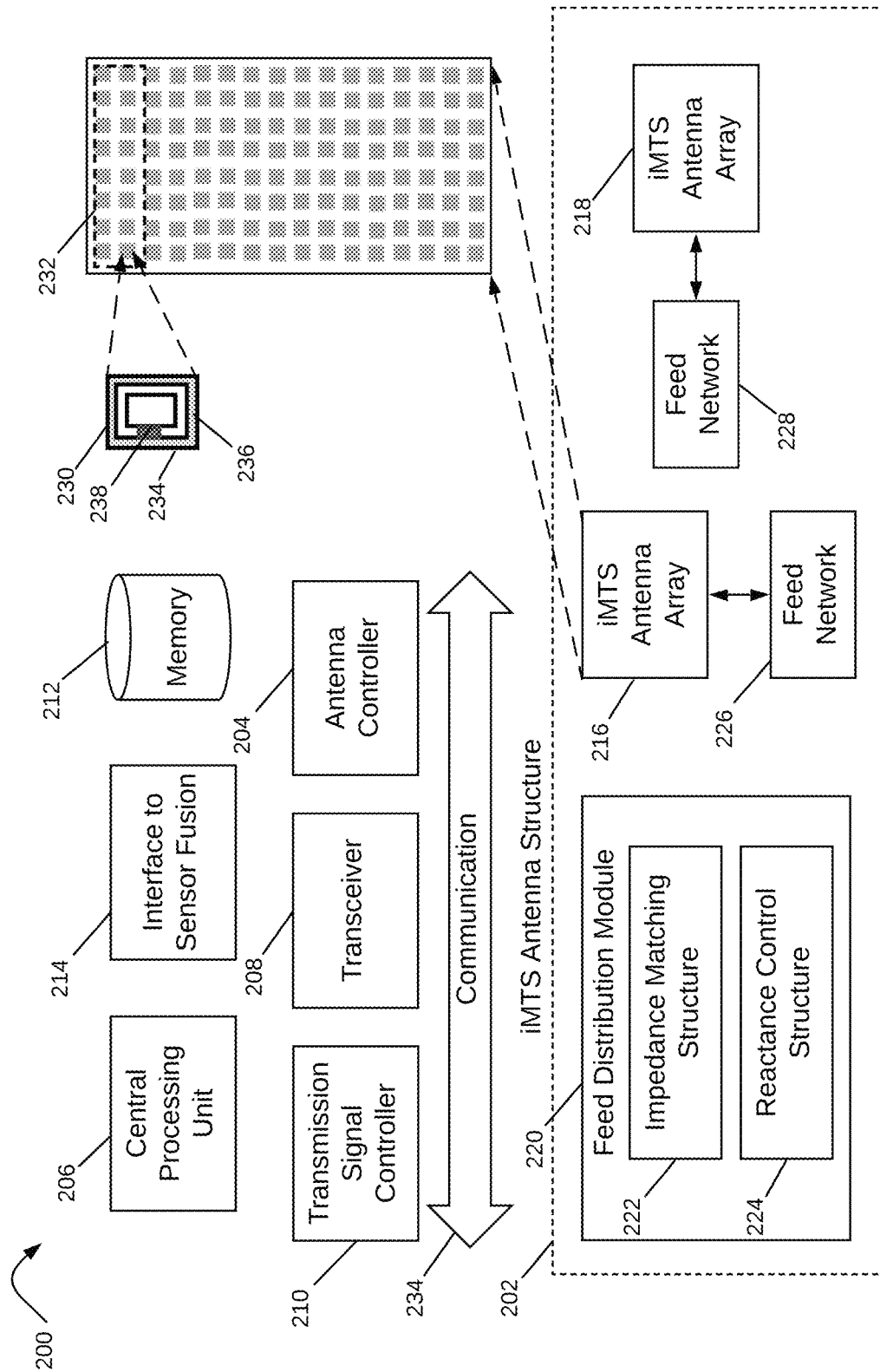
FIG. 2 is a schematic diagram of an iMTS antenna structure for use with the iMTS radar system of FIG. 1 in accordance with various examples.

Attention is now directed at FIG. 2, which shows a schematic diagram of an iMTS antenna module for use with the iMTS radar system of FIG. 1 in accordance with various examples. iMTS antenna module 200 has an iMTS antenna structure 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to an object by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to an object; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexing ("OFDM") signal. In some examples, the signal is provided to the iMTS antenna module 200 and the transmission signal controller 210 may act as an perception, translator or modulation controller, or otherwise as required for the signal to propagate through a transmission line system. The received information is stored in a memory storage unit 212, wherein the information structure may be determined by the type of transmission and modulation pattern.

The iMTS antenna structure 202 radiates the signal to a radiating array of iMTS cells in the iMTS antenna arrays 216-18. In various examples, the iMTS antenna structure 202 includes a feed distribution module 220, having an impedance matching structure 222 and a reactance control structure 224. The reactance control structure 224 includes a capacitance control mechanism controlled by antenna controller 204, which may be used to control the phase of a radiating signal from radiating array structures, such as iMTS antenna arrays 216-18.

In operation, the antenna controller 204 receives information from other modules in iMTS antenna module 200 and/or from iMTS perception module 104 in FIG. 1 indicating a next radiation beam, wherein a radiation beam may be specified by parameters such as beam width, transmit angle, transmit direction and so forth. The antenna controller 204 determines a voltage matrix to apply to the reactance control mechanisms in iMTS antenna structure 202 to achieve a given phase shift or other parameters. In these examples, the iMTS antenna structure 202 is adapted to transmit a directional beam without using digital beam forming methods, but rather through active control of the reactance parameters of the individual iMTS cells that make up each iMTS antenna array 216-18.

Transceiver 208 prepares a signal for transmission, such as a signal for a radar device, wherein the signal is defined by modulation and frequency. The signal is received by the iMTS antenna structure 202 and the phase of the iMTS cells in the iMTS antenna arrays 216-18 is adjusted at the direction of the antenna controller 204. In some examples, transmission signals are received by a portion, or subarray(s), of the iMTS antenna arrays 216-18 (e.g., subarray 232). These iMTS antenna arrays 216-18 are applicable to many applications, including radar, cellular antennas, and autonomous vehicles to detect and identify objects in the path of or surrounding the vehicle. Alternate examples may use the iMTS antenna arrays 216-18 for wireless communications, medical equipment, sensing, monitoring, and so forth. Each application type incorporates designs and configurations of the elements, structures and modules described herein to accommodate their needs and goals.

In iMTS antenna module 200, a signal is specified by antenna controller 204, which may be at the direction of an iMTS perception module (e.g., iMTS perception module 104 in FIG. 1), a sensor fusion module (described below with reference to FIG. 12) via interface to sensor fusion 214, or it may be based on program information from memory storage 212. There are a variety of considerations to determine the beam formation, wherein this information is provided to antenna controller 204 to configure the various elements of iMTS antenna arrays 216-18, which are described herein. The transmission signal controller 210 generates the transmission signal and provides it to the feed distribution module 220, which then provides it to feed networks 226-28 coupled to iMTS antenna arrays 216-18. Feed networks 226-28 may include a plurality of transmission lines configured with discontinuities within a conductive material.

The feed distribution module 220 has an impedance matching structure 222 and a reactance control structure 224 for respectively matching input signal parameters with the iMTS cells and providing phase shift control to each cell. The impedance matching structure 222 may include a directional coupler having an input port to each of adjacent transmission lines in the feed networks 226-28. The adjacent transmission lines in feed networks 226-28 and the impedance matching structure 222 may form a super element, wherein an adjacent transmission line pair has a specific phase difference, such as a 90° phase difference with respect to each other.

The impedance matching structure 222 works in coordination with the reactance control structure 224 to provide phase shifting of the radiating signal(s) from the iMTS antenna arrays 216-18. In various examples, the reactance control structure 224 includes a reactance control mechanism controlled by antenna controller 204, which may be used to control the phase of a radiating signal from the iMTS cells in arrays 216-18 and to adjust the effective reactance of a transmission line and/or a cell fed by a transmission line in the feed networks 226-28. The reactance control structure 224 may, for example, include a phase shift network system (not shown) to provide any desired phase shift up to 360°. The phase shift network system may include multiple varactors to achieve the desired phase shift.

One or more reactance control mechanisms may be placed within a transmission line in the feed networks 226-28. Similarly, reactance control mechanisms may be placed within multiple transmission lines or within each iMTS radiating cell to achieve a desired result. The reactance control mechanisms may have individual controls or may have a common control. In some examples, a modification to a first reactance control mechanism is a function of a modification to a second reactance control mechanism.

The impedance matching structure 222 and the reactance control structure 224 may be positioned within the architecture of feed distribution module 220; one or both may be external to the feed distribution module 220 for manufacture or composition as an antenna or radar module. The impedance matching structure 222 works in coordination with the reactance control structure 224 to provide phase shifting of the radiating signal(s) from iMTS antenna arrays 216-18.

As illustrated, iMTS antenna structure 200 includes the iMTS antenna arrays 216-18, composed of individual iMTS cells such as iMTS cell 230. The iMTS antenna arrays 216-18 may take a variety of forms and are designed to operate in coordination with the feed distribution module 220, wherein individual iMTS cells correspond to elements within the iMTS transmission arrays 216-18. In various examples, the transmission signals sent by the transceiver 208 are received by a portion, or subarray, of iMTS antenna arrays 216-18 (e.g., subarray 232). Each of the iMTS antenna arrays 216-18 is an array of individual iMTS radiating cells (e.g., an 8×16 array), wherein each of the iMTS cells (e.g., MTM cell 230) has a uniform size and shape; however, some examples may incorporate different sizes, shapes, configurations and array sizes.

In various examples, the iMTS cell may include MTM cells. Each MTM cell (e.g., MTM cell 230) is an artificially structured element used to control and manipulate physical phenomena, such as electromagnetic ("EM") properties of a signal including the amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. An MTM cell such as cell 230, may be composed of multiple microstrips, gaps, patches, vias, and so forth having a behavior that is the equivalent to a reactance element, such as a combination of series capacitors and shunt inductors. In one example, MTM cell 230 is illustrated having a conductive outer portion or loop 234 surrounding a conductive area 236 with a space in between. Each MTM cell 230 may be configured on a dielectric layer, with the conductive areas and loops provided around and between different MTM cells. A voltage controlled variable reactance device 238 e.g., a varactor, provides a controlled reactance between the conductive area 236 and the conductive loop 234. The controlled reactance is controlled by an applied voltage, such as an applied reverse bias voltage in the case of a varactor. The change in capacitance changes the behavior of the MTM cell 230, enabling the iMTS array 216 to provide focused, high gain beams directed to a specific location.

It is appreciated that additional circuits, modules and layers may be integrated with the iMTS array 216. It is also appreciated that various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an MTM cell radiates according to its configuration. Changes to the reactance parameters of the MTM cell change the radiation pattern. Where the radiation pattern is changed to achieve a phase change or phase shift, the resultant structure is a powerful antenna or radar, as small changes to the MTM cell result in large changes to the beamform.

The MTM cells include a variety of conductive structures and patterns, such that a received transmission signal is radiated therefrom. In various examples, each MTM cell (e.g., cell 230) has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

The iMTS antenna arrays 216-18 may have a periodic arrangement (e.g., array, lattice, etc.) of iMTS cells that are each smaller than the transmission wavelength. When a transmission signal is provided to the iMTS antenna structure 202, such as through a coaxial cable or other connector, the signal propagates through the feed distribution module 220 to the iMTS transmission arrays 216-18 for transmission through the air.

Note that as illustrated, there are two iMTS antenna arrays 216-18. However, iMTS antenna structure 202 may incorporate multiple other antenna arrays. In various examples, each iMTS antenna array may be for transmission and/or receiving of radiation patterns, where at least one of the arrays is for transmission in the azimuth, or horizontal, direction, and at least another is for receiving of radiation patterns over the elevation of the array, with the antenna arrays having orthogonal radiation beams. Note also that the iMTS antenna arrays 216-18 are shown with separate feed networks 226-28, but could in some examples, share a feed network. In various examples, antenna arrays may be configured to detect different objects, e.g., a set of antenna arrays may be configured to enhance the detection and identification of pedestrians, another set of antenna arrays may be configured to enhance the detection and identification of other vehicles, and so forth. In the case of pedestrians, the configuration of the antenna arrays may include power amplifiers to adjust the power of a transmitted signal and/or different polarization modes for different arrays to enhance pedestrian detection.

Figure 3:
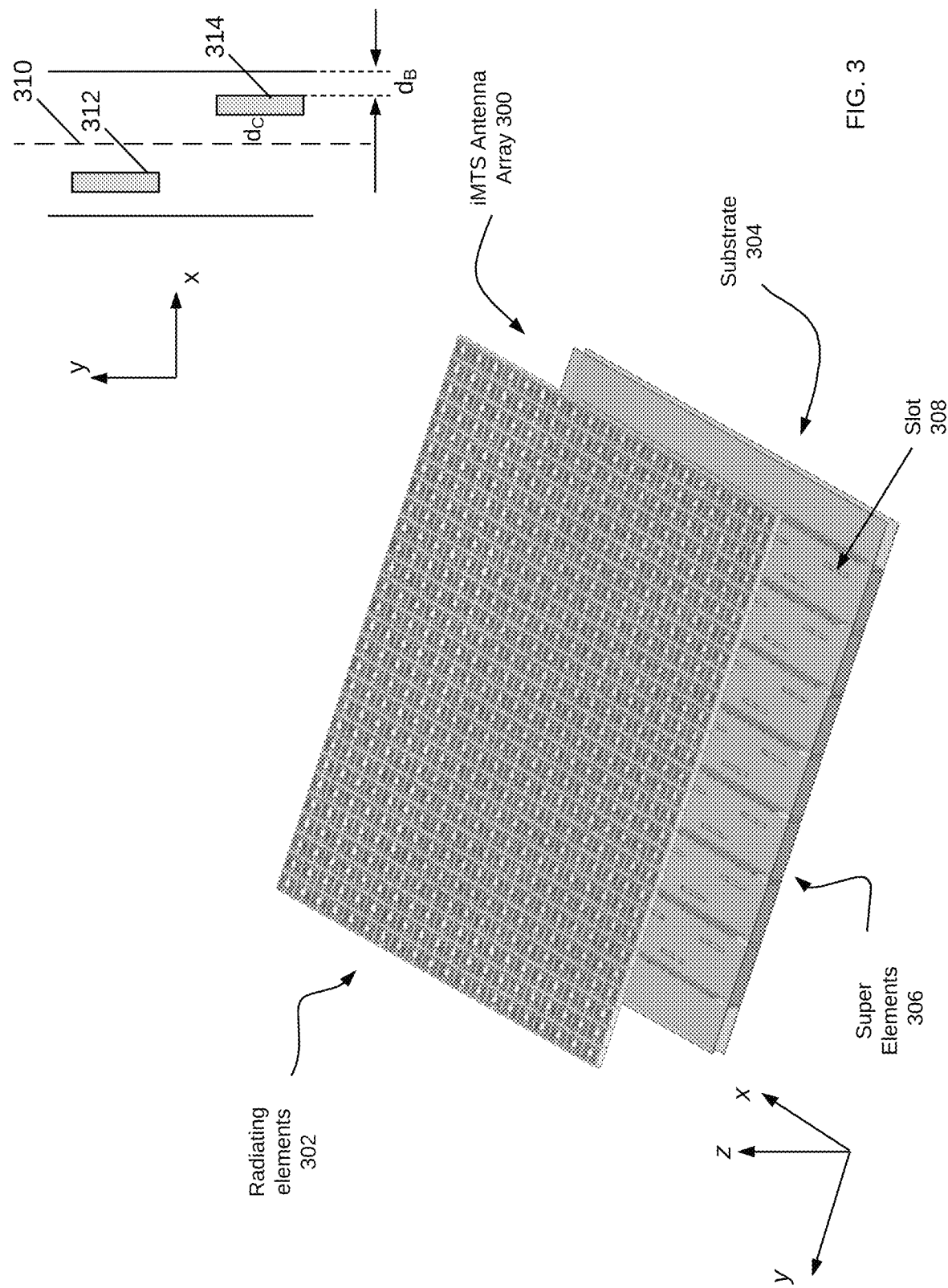
FIG. 3 is a schematic diagram of an example iMTS antenna structure in accordance with various examples.

FIG. 3 illustrates an example of an iMTS antenna array 300 having radiating elements 302, which are each iMTS cells. The array 300 of iMTS cells may operate as a single array or may be controlled to operate as multiple subarrays, wherein each of the array or subarrays acts to generate a radiation beamform that is steerable through control of the reactance of individual iMTS unit cells. The feed structure for the iMTS antenna array structure 300 is a substrate 304 having multiple conductive layers and a dielectric layer sandwiched therebetween. The feed 304 is configured as super elements 306 that are along the x-direction of the iMTS antenna array 300, wherein each super element includes a plurality of slots or discontinuities (e.g., slot 308) in the conductive layer proximate the radiating elements 302. A signal is provided to each of the super elements 306 that radiates through the slots in the super elements and feeds the radiating elements 302. The various super elements 306 may be fed with signals of different phase, thus providing phase shifting in the y-direction, while the iMTS antenna array 300 may be controlled so as to shift the phase of the transmission signal in the y-direction and/or the x-direction, wherein the signal transmits in the z-direction. The ability to control the directivity and phase of the transmission signal provides flexibility and responsive behavior for wireless communications and radar applications.

The feed 304 may be referred to as a type of a Slotted Waveguide Antenna ("SWA") and may include passive or active components (not shown) for matching phase control, amplitude tampering, and other RF enhancement functionalities. The distances between the iMTS unit cells in super elements 306 can be much lower than half the wavelength of the radiating frequency of the transmission signal. Active and passive components may be placed on the iMTS cells with control signals either routed internally through the super elements 306 or externally through or on upper portions of the feed 304. Alternate configurations may reconfigure and/or modify the iMTS antenna array 300 to improve radiation patterns, bandwidth, side lobe levels, and so forth.

Figure 4:
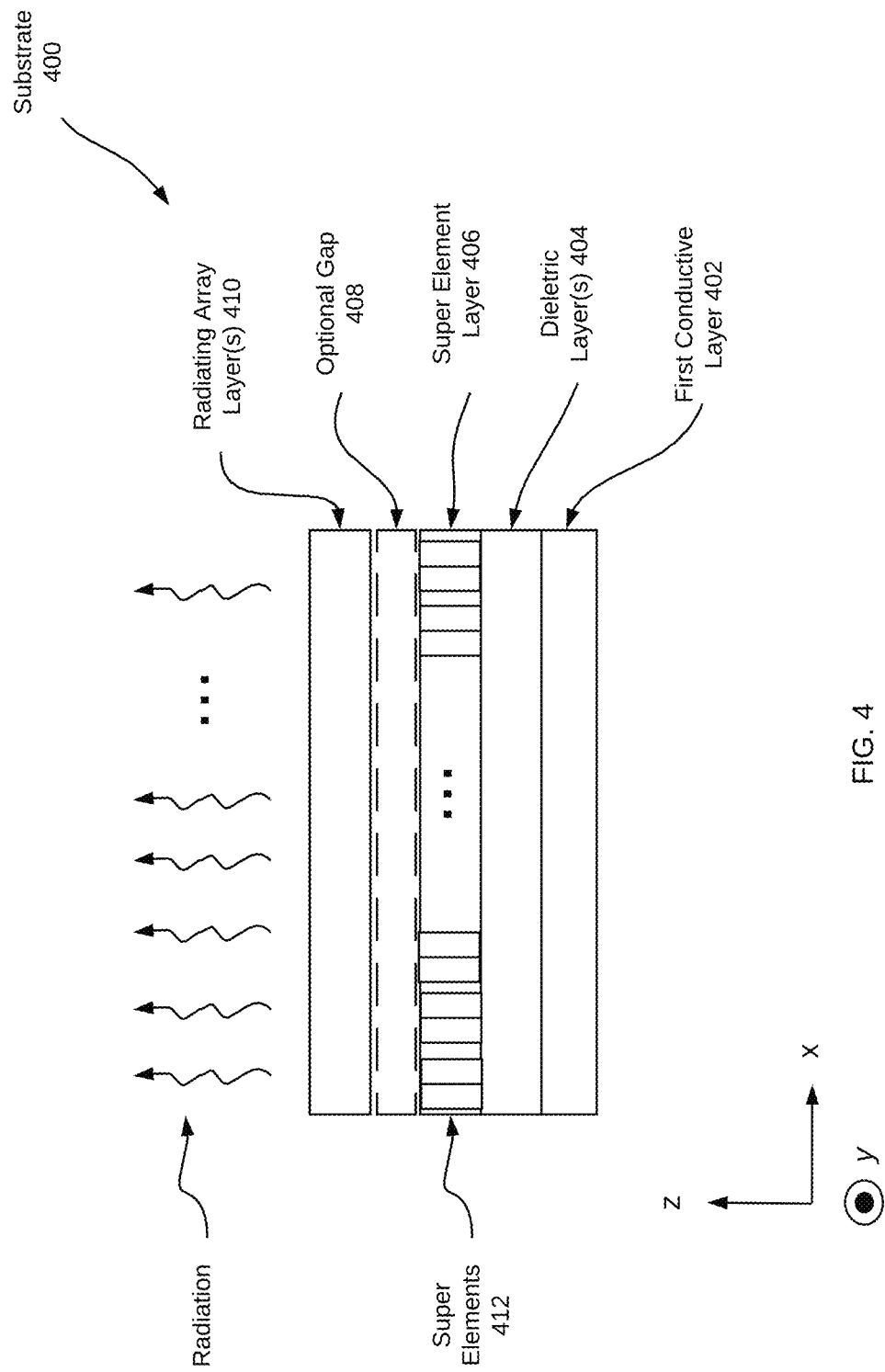
FIG. 4 is another perspective of the iMTS antenna array of FIG. 3 illustrating its various layers.

The antenna performance may be adjusted by design of the iMTS antenna array 300 features and materials, such the shape of the slots, slot patterns, slot dimensions, conductive trace materials and patterns, as well as other modifications to achieve impedance matching and so forth. The substrate/feed 304 has two portions of dielectric separated by a slotted transmission line positioned therebetween. The slotted transmission line sits on substrate 304, wherein each transmission line is within a bounded area; the boundary is a line of vias cut through the conductive layer. The slots are configured within the conductive layer and spaced as illustrated in FIGS. 3-4, where in the illustrated example the slots (e.g., slot 308) are positioned symmetrically with respect to the center line 310. For clarity of understanding, FIG. 3 illustrates the slots as equidistant from center line 310, where slots 312 and 314 are on opposite sides of the centerline 310, but are equidistant to the center line 310 and staggered along the direction thereof. A small portion super element is illustrated in the cut-out, having slots 312-14 with respect to the center line 310. The distance in the y-direction from the edge of a slot to the boundary via is given as $d_B$, and the distance from the centerline 310 to the slot is given as dc.

FIG. 4 is another perspective of the iMTS antenna array of FIG. 3 illustrating its various layers. Substrate 400 includes a first conductive layer 402, a dielectric layer(s) 404, and a super element layer 406. The super elements are formed by conductive and non-conductive traces on a top portion of the super element layer 406 and by vias formed through the super element layer 406 and through the dielectric layer(s) 404. The vias (not shown) are lined with conductive material, or may be filled with conductive material, so as to form channels defining the super elements 412 and providing a wave guide function to maintain propagation of the signals fed into the super elements 412. An optional gap 408 may be placed between the super element layer 406 and the radiating array layer 410, which contains the iMTS cells. The longitudinal direction of the super elements 412 in the perspective of FIG. 4 is into the page, in the y-direction, with the signal radiating in the z-direction. Again, note these directions are for illustration and description purposes only and do not necessarily correlate to absolute references. Note also that the iMTS array 400 may be part of a sensor fusion module (e.g., sensor fusion module 420 of FIG. 4 within the vehicle or infrastructure, whereby different locations share information and communicate with each other to provide information ahead of action, such as to identify a speeding car several blocks before it actually is in range of a given sensor. One or multiple sensors may provide alerts to other sensors in the environment to be on the look-out for a speeder.

Figure 5:
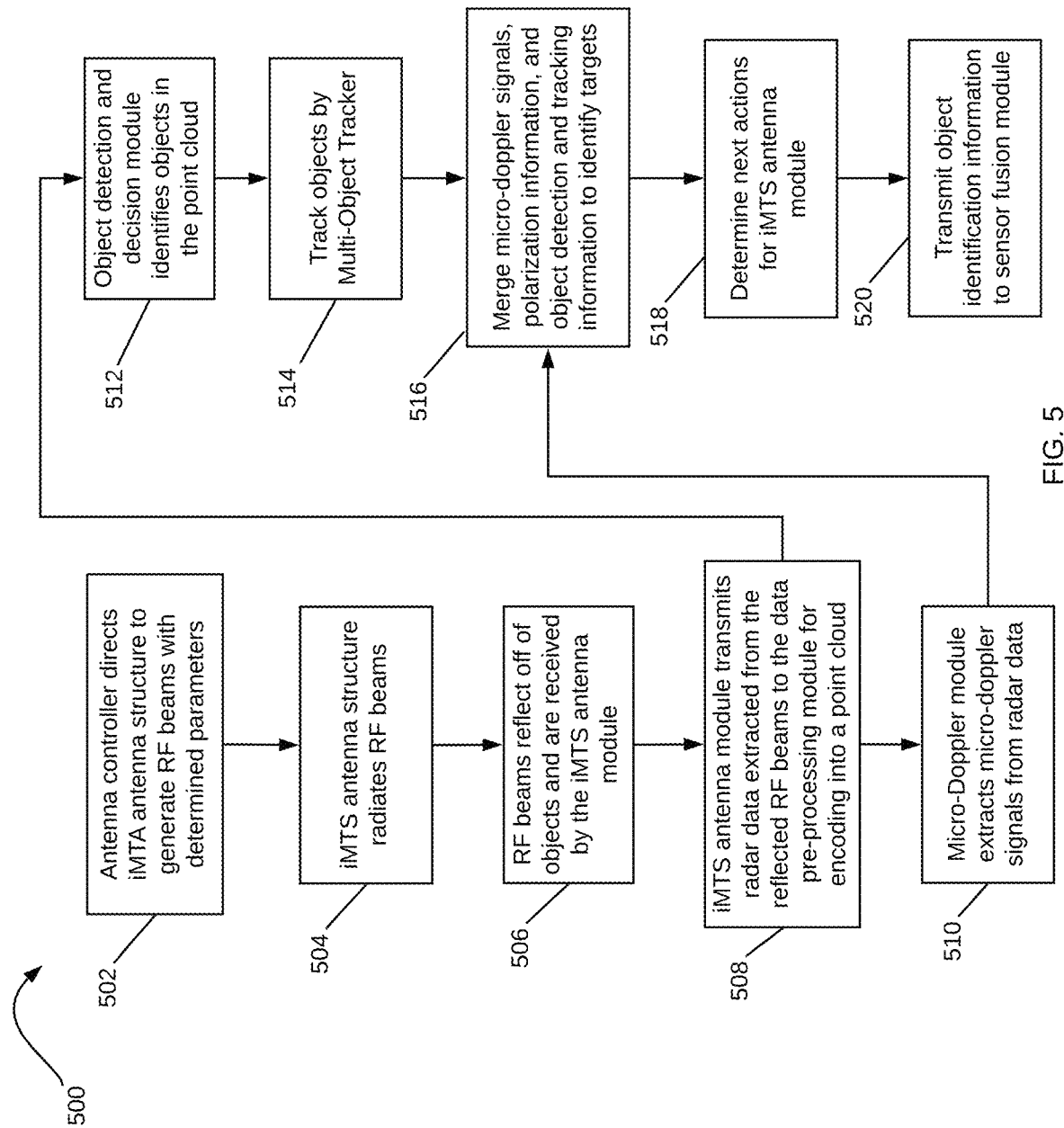
FIG. 5 is a flowchart illustrating the operation of an example iMTS radar system in more detail.

Referring now to FIG. 5, a flowchart illustrating the operation of an example iMTS radar system in more detail is described. In one example, the iMTS radar system may be implemented as the iMTS radar system 100 of FIG. 1. In operation, the antenna controller 110 is responsible for directing the iMTS antenna structure 106 to generate RF beams with determined parameters such as beam width, transmit angle, etc. (502). The antenna controller 110 may, for example, determine the parameters at the direction of iMTS perception module 104, which may at any given time want to focus on a specific area of a FoV upon identifying objects of interest in the vehicle's path. The antenna controller 110 determines the direction, power, and other parameters of the beams and controls the iMTS antenna structure 106 to achieve beam steering in various directions. The antenna controller 110 also determines a voltage matrix to apply to capacitance control mechanisms in the iMTS antenna structure 106 (or coupled to the iMTS antenna structure 106) to achieve a given phase shift. In some examples, the iMTS antenna structure 106 is adapted to transmit a directional beam through active control of the reactance parameters of the individual iMTS cells in the iMTS antenna arrays (e.g., arrays 216-18) of the iMTS array structure 106. The iMTS perception module 104 provides control actions to the antenna controller 110 at the direction of the object identification and decision module 114.

Next, the iMTS antenna structure 106 radiates RF beams having the determined parameters (504). The RF beams are reflected off of objects in and around the vehicle's path (e.g., in a 360° field of view) and are received by the transceiver module 108 in the iMTS antenna module 102 (506). The iMTS antenna module 102 then transmits 4D radar data to the data pre-processing module 112 for encoding into a point cloud (508). The micro-doppler module 116 coupled to the iMTS antenna module 102 and the iMTS perception module 104 extracts micro-doppler signals from the 4D radar data to aid in the identification of objects by the object identification and decision module 114 (510). The micro-doppler module 116 takes a series of RD maps from the iMTS antenna module 102 and extracts a micro-doppler signal from them. The micro-doppler signal enables a more accurate identification of objects as it provides information on the occupancy of an object in various directions.

The object identification and decision module 114 receives the 4D radar data from the iMTS antenna module 102, processes the radar data to detect and identify objects, and determines the control actions to be performed by the iMTS antenna module 102 based on the detection and identification of such objects (512). For example, the object identification and decision module 114 may detect a cyclist on the path of the vehicle and direct the iMTS antenna module 102, at the instruction of its antenna controller 110, to focus additional RF beams at given phase shift and direction within the portion of the field of view corresponding to the cyclist's location.

The iMTS perception module 104 also includes a multi-object tracker 118 to track the identified objects over time, such as, for example, with the use of a Kalman filter (514). Information on identified objects over time are stored at an object list and occupancy map 120, which keeps tracks of objects' locations and their movement over time as determined by the multi-object tracker 118. The tracking information provided by the multi-object tracker 118, the micro-doppler signal provided by the micro-doppler module 116, and the object detection and identification information from the object identification and decision module 114 (i.e., from POL 126, CNN 128 and DNN 130) are combined to produce an output containing the type of object identified, their location, their velocity, and so on (516). This information from iMTS perception module 104 is then used to determine next actions to be performed by the iMTS antenna module 102 such as what beams to send next and with which parameters (e.g., beam width, azimuth and elevation angles, etc.) (518). The determination may also include a selection of subarrays in the iMTS antenna arrays in the iMTS antenna module 102 from which to send the next beams. The output from the iMTS perception module 104 is also sent to a sensor fusion module (described in more detail below with reference to FIG. 12) where it is processed together with information from other sensors in the vehicle (520).

As described above, object identification is accomplished in part by having iMTS antennas with polarization that is targeted towards a specific object. For example, an iMTS antenna with horizontal polarization may be configured to identify vehicles, while an iMTS antenna with vertical polarization may be configured to identify pedestrians. Targeted polarization for object identification is implemented to take advantage of how radar signals reflect differently from different materials. Vehicles, which are made of metal materials, maintain the polarization of the incident radar signals in their scattering. Pedestrians, on the other hand, can be considered to be a dielectric and scatter radar signals in different directions. Comparing the polarization of received radar signals scattered by different objects can therefore assist in the identification of such objects.

Attention is now directed to FIG. 6, which illustrates a schematic diagram of an iMTS antenna module 600, according to various examples. iMTS antenna module 600, similar to iMTS antenna module 102 in FIG. 1, has an antenna controller 602 and a transceiver 604. iMTS antenna module 600 also has multiple iMTS antenna structures 606-620, such as iMTS antenna structures 606-612 used for transmission and iMTS antenna structures 614-20 used for receiving of radar signals scattered off of objects. In some examples, the iMTS antenna structures 606-612 may include individual or multiple iMTS antennas. The sets of iMTS antennas may also be subarrays of one or more iMTS antennas, where each subarray may be dynamically controlled. In various examples, the transmit antennas 608-612 transmit signals with a horizontal polarization, while the receive antennas 614-620 have targeted polarization. As illustrated, receive antennas 614-616 are designed to receive horizontally polarized signals, while receive antennas 618-620 are designed to receive vertically polarized signals. It is noted that different configurations of transmit and receive antennas may be implemented, such as receive antennas with different targeted polarizations (e.g., elliptical) or more receive antennas for one type of polarization than another.

Figure 7:
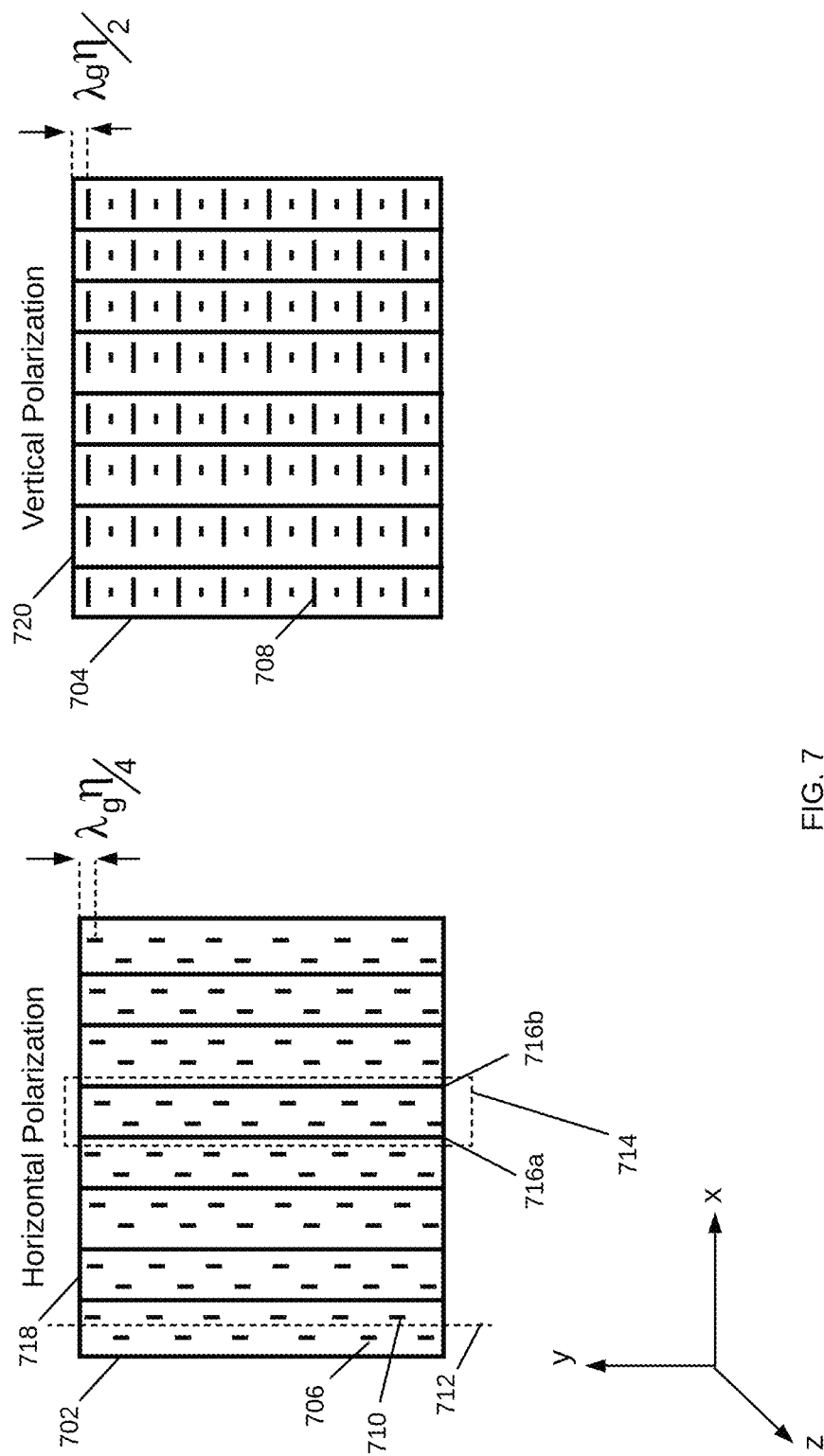
FIG. 7 illustrates an example iMTS antenna designed to receive signals with horizontal polarization and an example iMTS antenna designed to receive signals with vertical polarization.

FIG. 7 illustrates an example iMTS antenna designed to receive signals with horizontal polarization and an example iMTS antenna designed to receive signals with vertical polarization. iMTS antenna 702 is a Slotted Waveguide Antenna ("SWA") having longitudinal slots on the broad face of the waveguide as illustrated. iMTS antenna 702 is an SWA having transverse slots. The iMTS antenna 702 is designed to receive horizontally polarized radar signals, while the iMTS antenna 704 is designed to receive vertically polarized radar signals. Each iMTS antenna 702-704 has a number of slots (e.g., slots 706-710) along its surface. The slots in each antenna are equidistant to a center line and staggered along the direction thereof. For example, slots 706-710 are equidistant from center line 712 in iMTS antenna 702. Equidistant slots are part of a super element, such as super element 714 bounded by vias 716a-b. The super elements can be thought of as waveguides, bounded by conductive vias along their sides and a ground at their end, such as grounds 718-720.

The distance between the center of a slot in horizontally polarized iMTS antenna 702 and the edge of a super element is shown as $\lambda_g \eta/4$, where $\lambda_g$ is the guide wavelength and $\eta$ is an integer such that $\eta=1, 2, 3, \ldots$. The distance between the center of a slot in vertically polarized iMTS antenna 704 is shown as $\lambda_g \eta/2$. The different distance measures are a result of the different orientation of the slots in the horizontally polarized and vertically polarized antennas 702-704, with the horizontally polarized iMTS antenna 702 having longitudinal slots and the vertically polarized iMTS antenna 704 having transverse slots. The distance measures are also different due to the different surface currents in antennas 702-704.

Figure 8:
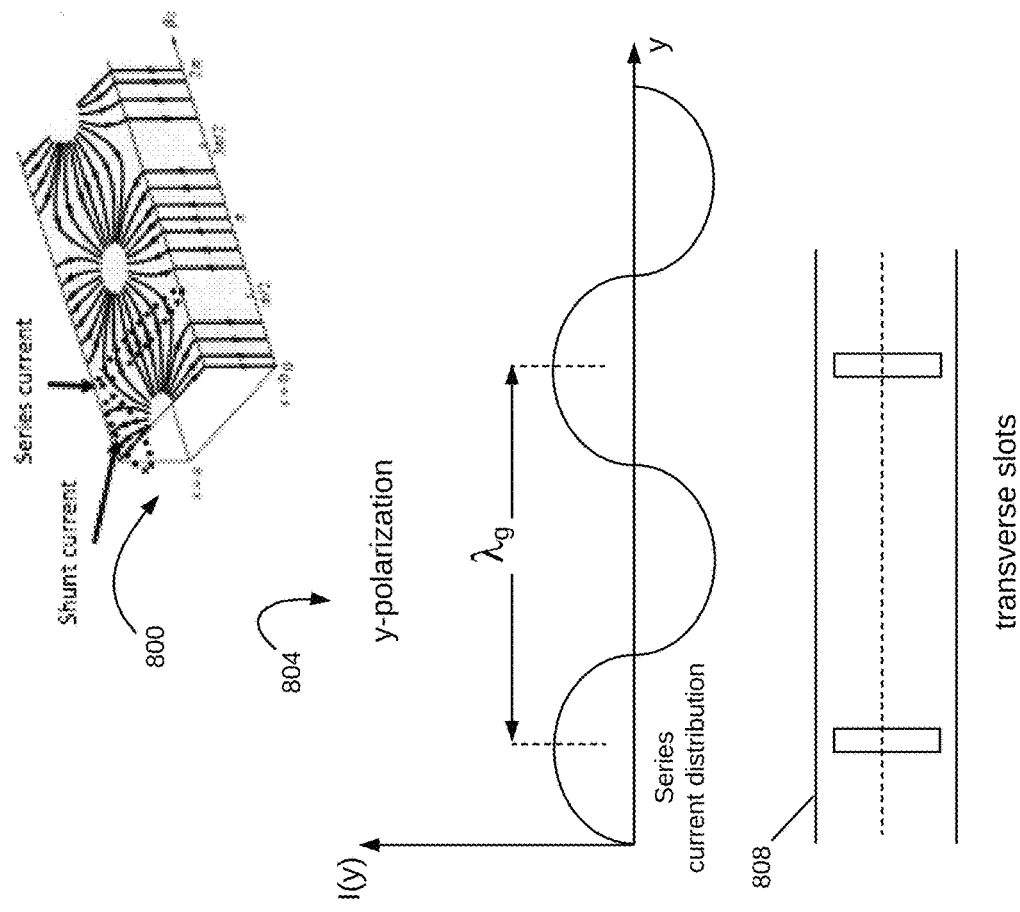
FIG. 8 illustrates the surface currents in an example Slotted Waveguide Antenna ("SWA")
Figure 8:
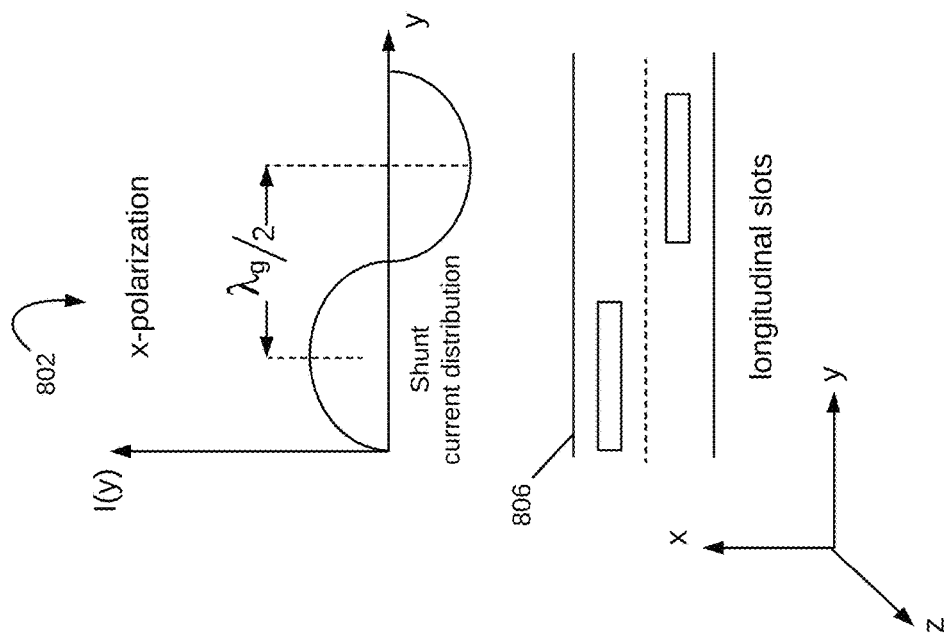

FIG. 8 illustrates the surface currents in an example SWA. SWA 800 has both shunt and series currents with distributions 802-804. For the horizontally polarized antenna 806, the longitudinal slots are placed at a distance of $\lambda_g/2$ as shown with the shunt current distribution 802. For the vertically polarized antenna 808, the transverse slots are placed at a distance of $\lambda_g$, as shown with the series current distribution 804. Note that for excitation current to be in phase, the slots on antenna 802 are separated by $\lambda_g$. In one example, $\lambda_g$ is about $0.7\lambda_o$. It is noted that grating lobes start to appear when array spacing is greater than $\lambda_o/2$. The grating lobes can be eliminated or significantly reduced by reducing the distance between the transverse slots.

Figure 9:
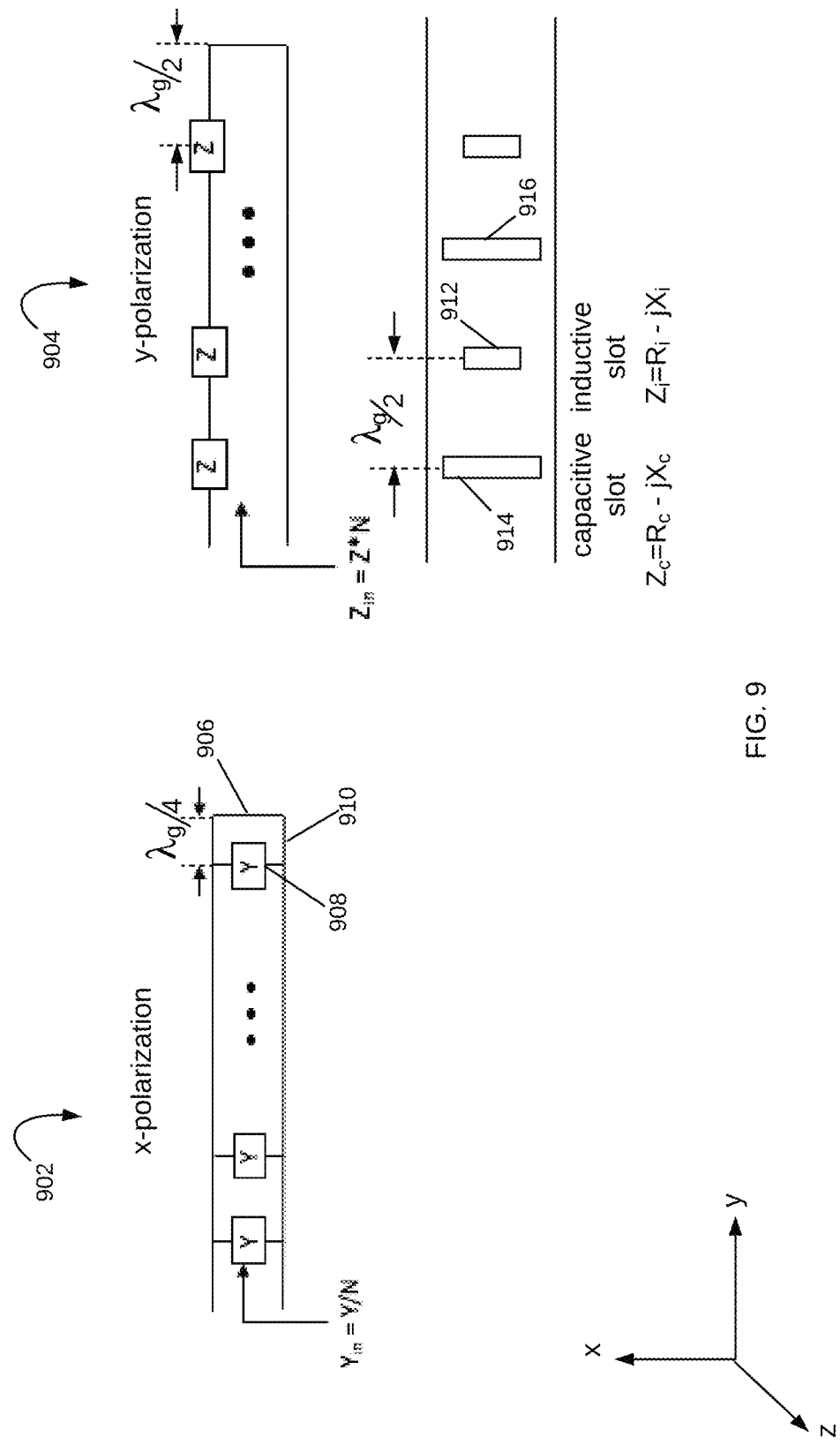
FIG. 9 illustrates equivalent circuits for horizontally and vertically polarized iMTS antennas in accordance with various examples.

FIG. 9 illustrates equivalent circuits for horizontally and vertically polarized iMTS antennas. Circuit 902 is an equivalent circuit for a horizontally polarized iMTS antenna having longitudinal slots as iMTS antenna 702 and iMTS antenna 806. In circuit 902, edge 906 represents a short at the end of the iMTS antenna. With the distance between the center of the slot 908 and the short 906 at $\lambda g/4$, circuit portion 910 becomes an open circuit and the antenna 902 is horizontally polarized. Circuit 904 is an equivalent circuit for a vertically polarized iMTS antenna having transverse slots. In this case, intermediate inductive slots of a smaller size are interspersed in the antenna with capacitive slots, such as inductive slot 912 between capacitive slots 914-16. The capacitive and inductive slots in antenna 904 have impedances that are 1800 out of phase. The surface currents separated by $\lambda g/2$ are also 180° out of phase. The alternating capacitive and inductive slots lead to better impedance matching, and the distance reduction of $\lambda g/2$ between the slots eliminates or significantly reduces grating lobes.

Figure 10:
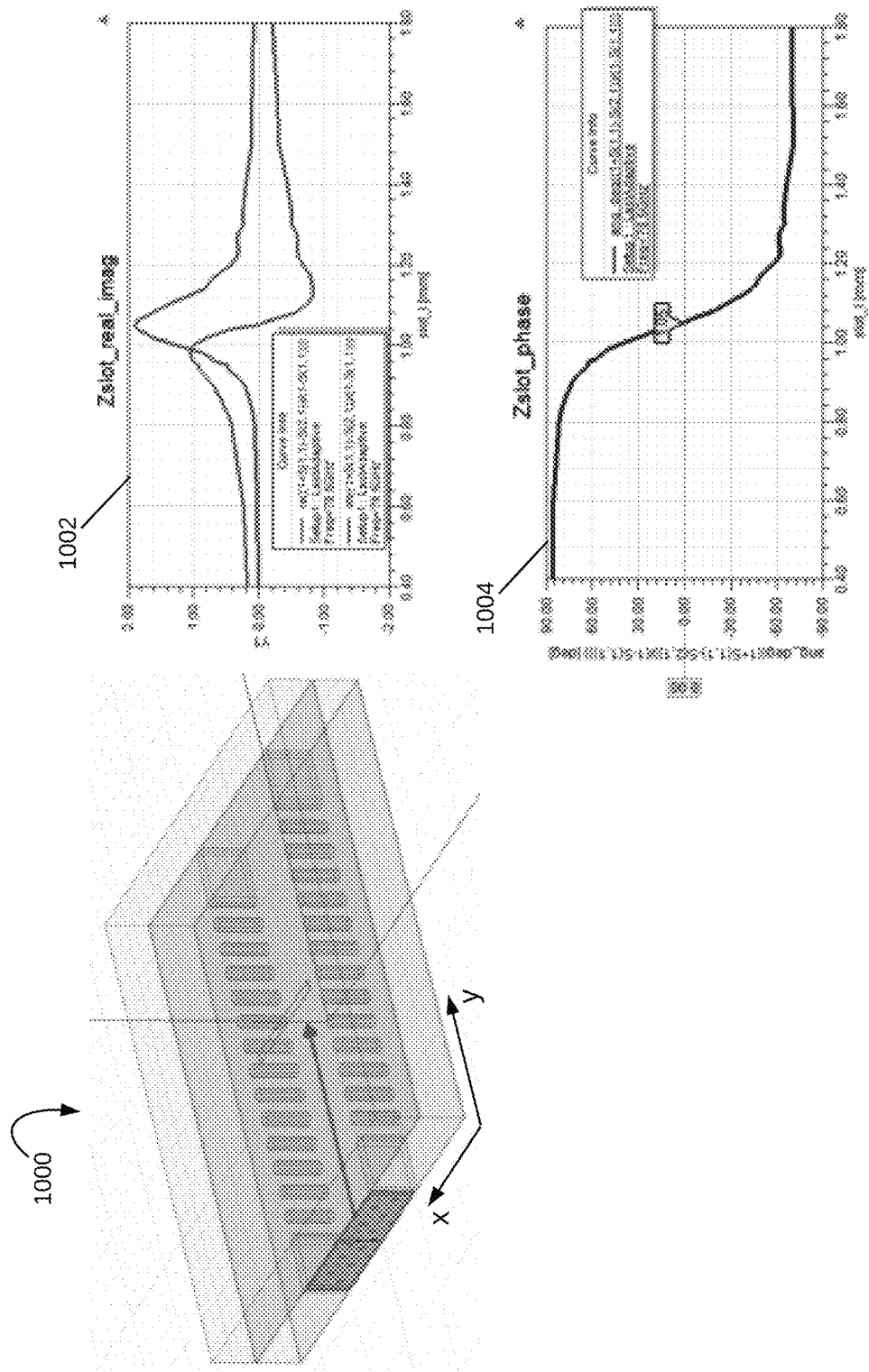
FIGS. 10-11 illustrate the characteristics and performance of a vertically polarized iMTS antenna array with alternating capacitive and inductive slots.
Figure 11:
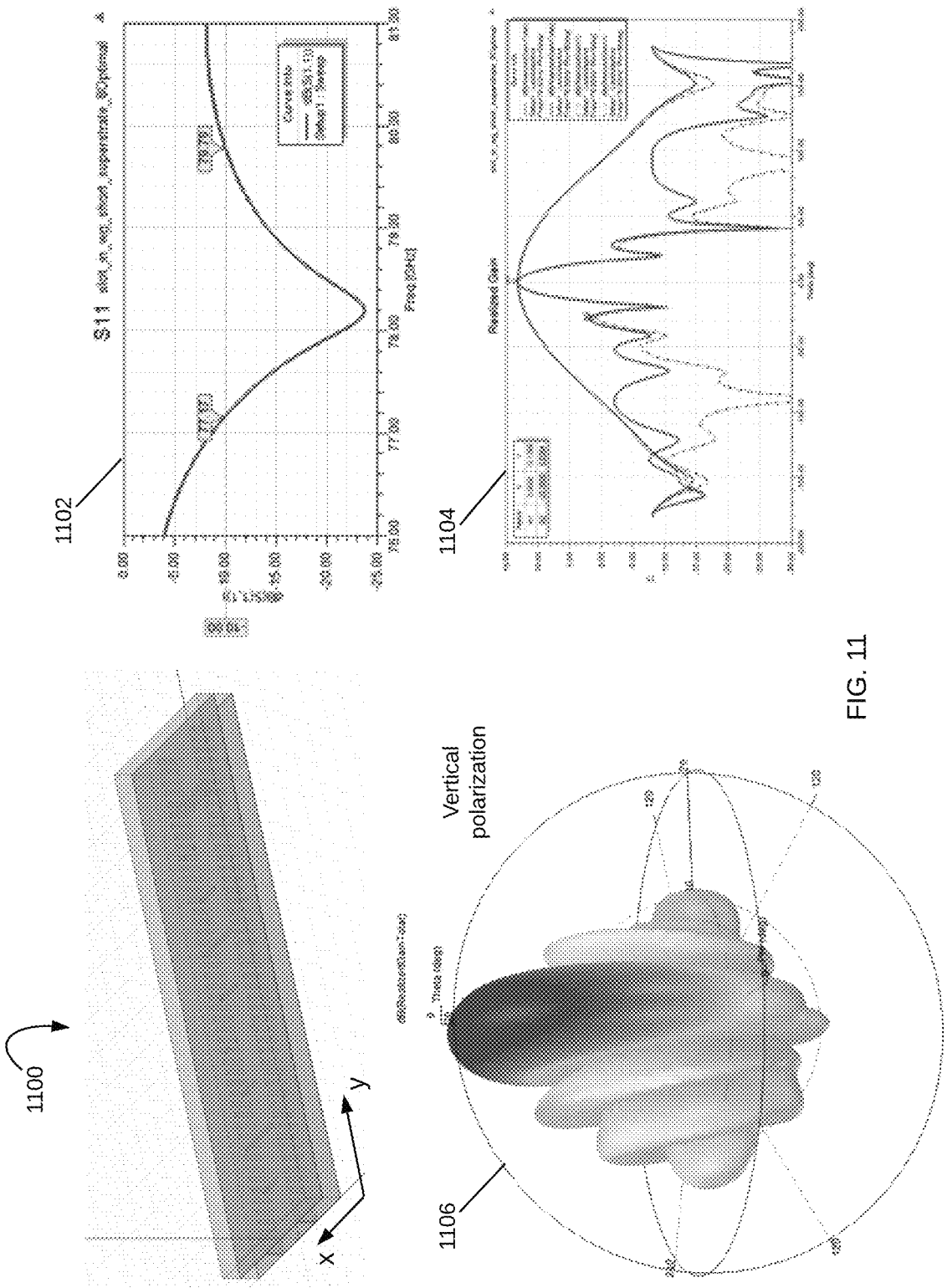

FIGS. 10-11 illustrate the characteristics and performance of a vertically polarized iMTS antenna array with alternating capacitive and inductive slots. In FIG. 10, the impedance graphs 1002 and 1004 are shown for the impedance and phase for the slots in antenna 1000. In FIG. 11, the S11 parameter of the antenna 1100 is shown in graph 1102. The gain of the antenna is plotted in graph 1104, and the radiation pattern is shown in 1106. Note that the gain in 1104 and radiation pattern in 1106 show that the antenna is predominantly vertically polarized with significantly reduced grating lobes.

The vertically polarized antenna 1100, as well as the vertically polarized antenna 1000 of FIG. 10, the antenna with the equivalent circuit 904 of FIG. 9, the antenna 808 of FIG. 8, the antenna 704 of FIG. 7, and the receive antennas 618-20 of FIG. 6, can all be used to enhance pedestrian detection and identification in an iMTS radar system. A horizontally polarized antenna such as the antenna with the equivalent circuit 902 of FIG. 9, the antenna 806 of FIG. 8, the antenna 702 of FIG. 7, and the receive antennas 614-16 of FIG. 6 can instead be used to enhance vehicle detection. Incorporating both antennas in an iMTS radar system as shown in FIG. 6 improves the detection and identification performance of an iMTS radar system.

Figure 12:
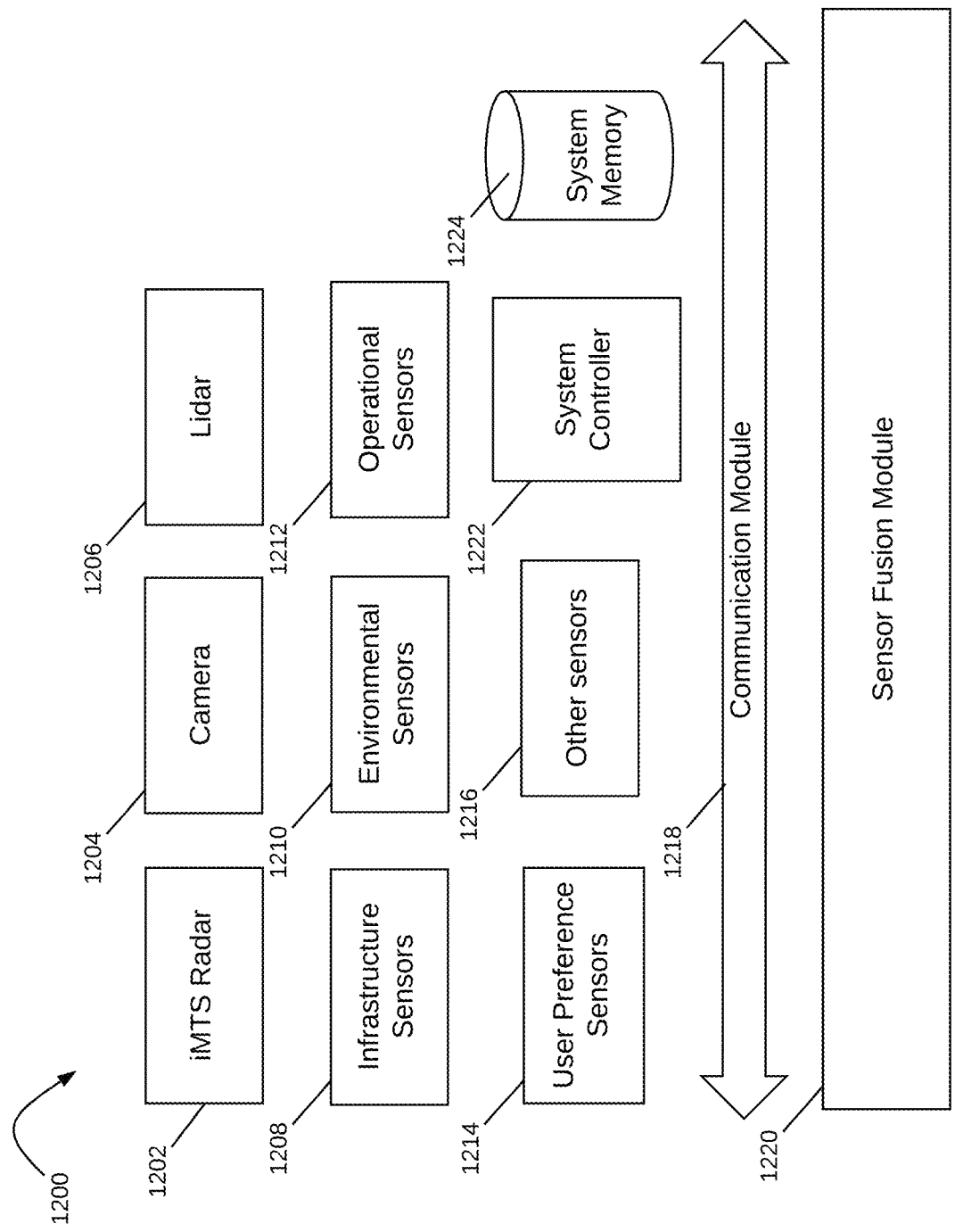
FIG. 12 illustrates a schematic diagram of an autonomous driving system having an iMTS radar in accordance with various examples.

The performance of an iMTS radar system can also be improved with a sensor fusion module, which processes the object detection and identification of the radar together with object detection and identification from other sensors in a vehicle. FIG. 12 illustrates a schematic diagram of an autonomous driving system having an iMTS radar in accordance with various examples. Autonomous driving system 1200 is a system for use in a vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 1200 includes an iMTS radar 1202 and other sensor systems such as camera 1204, lidar 1206, infrastructure sensors 1208, environmental sensors 1210, operational sensors 1212, user preference sensors 1214, and other sensors 1216. Autonomous driving system 1200 also includes a communications module 1218, a sensor fusion module 1220, a system controller 1222 and a system memory 1224. It is appreciated that this configuration of autonomous driving system 1200 is an example configuration and not meant to be limiting to the specific structure illustrated in FIG. 12. Additional systems and modules not shown in FIG. 12 may be included in autonomous driving system 1200.

iMTS radar 1202 includes an iMTS antenna module (e.g., iMTS antenna module 102) for providing dynamically controllable and steerable beams that can focus on one or multiple portions of a 360° FoV of the vehicle. The beams radiated from the iMTS antenna module are reflected back from objects in the vehicle's path and surrounding environment and received and processed by the iMTS radar 1202 to detect and identify the objects. The iMTS radar 1202 also has an iMTS perception module (e.g., iMTS perception module 104 of FIG. 1) that is trained to detect and identify objects and control the iMTS antenna module as desired.

Camera sensor 1204 may be used to detect visible objects and conditions and to assist in the performance of various functions. The lidar sensor 1206 can also be used to detect objects outside the vehicle and provide this information to adjust control of the vehicle. This information may include information such as congestion on a highway, road conditions, and other conditions that would impact the sensors, actions or operations of the vehicle. Camera sensors are currently used in ADAS systems to assist drivers in driving functions such as parking (e.g., in rear view cameras). Cameras are able to capture texture, color and contrast information at a high level of detail, but similar to the human eye, they are susceptible to adverse weather conditions and variations in lighting. Lidar sensors measure the distance to an object by calculating the time taken by a pulse of light to travel to an object and back to the sensor. When positioned on top of a vehicle, lidars are able to provide a 360° 3D view of the surrounding environment. However, lidar sensors are still prohibitively expensive, bulky in size, sensitive to weather conditions and are limited to short ranges (typically <200 m), with resolution decreasing with range. Radars, on the other hand, have been used in vehicles for many years and operate in all-weather conditions. Radars also use far less processing than the other types of sensors and have the advantage of detecting objects behind obstacles and determining the speed of moving objects.

Infrastructure sensors 1208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 1210 detect various conditions outside, such as temperature, humidity, fog, visibility, precipitation, and so forth. Operational sensors 1212 provide information about the functional operation of the vehicle. This may be tire pressure, fuel levels, brake wear, and so forth. The user preference sensors 1214 may be configured to detect conditions that are part of a user preference. This may be temperature adjustments, smart window shading, and so forth. Other sensors 1216 may include additional sensors for monitoring conditions in and around the vehicle.

In various examples, the sensor fusion module 1220 optimizes these various functions to provide an approximately comprehensive view of the vehicle and environments. Many types of sensors may be controlled by the sensor fusion module 1220. These sensors may coordinate with each other to share information and consider the impact of one control action on another system. In one example, in a congested driving condition, a noise detection module (not shown) may identify that there are multiple radar signals that may interfere with the vehicle. This information may be used by the iMTS perception module in system 1200 to adjust the beam size of the iMTS antenna module so as to avoid these other signals and minimize interference.

In another example, environmental sensor 1210 may detect that the weather is changing, and visibility is decreasing. In this situation, the sensor fusion module 1220 may determine to configure the other sensors to improve the ability of the vehicle to navigate in these new conditions. The configuration may include turning off camera or laser sensors 1204-1206 or reducing the sampling rate of these visibility-based sensors. This effectively places reliance on the sensor(s) adapted for the current situation. In response, the iMTS perception module (e.g., iMTS perception module 104 of FIG. 1) configures the iMTS radar 1202 for these conditions as well. For example, the iMTS radar 1202 may reduce the beam width to provide a more focused beam, and thus a finer sensing capability.

In various examples, the sensor fusion module 1220 may send a direct control to the iMTS antenna module (e.g., iMTS antenna module 102) based on historical conditions and controls. The sensor fusion module 1220 may also use some of the sensors within system 1200 to act as feedback or calibration for the other sensors. In this way, an operational sensor 1212 may provide feedback to the iMTS perception module and/or the sensor fusion module 1220 to create templates, patterns and control scenarios. These are based on successful actions or may be based on poor results, where the sensor fusion module 1220 learns from past actions.

Data from sensors 1202-1216 may be combined in sensor fusion module 1220 to improve the object detection and identification performance of autonomous driving system 1200. Sensor fusion module 1220 may itself be controlled by system controller 1222, which may also interact with and control other modules and systems in the vehicle. For example, system controller 1222 may turn the different sensors 1202-1216 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 1200 communicate with each other through communication module 1218. Autonomous driving system 1200 also includes system memory 1224, which may store information and data (e.g., static and dynamic data) used for operation of system 1200 and the vehicle using system 1200. Communication module 1218 may also be used for communication with other vehicles, referred to as V2V communication. V2V communications may include information from other vehicles that is invisible to the user, driver, or rider of the vehicle, and may help vehicles coordinate to avoid an accident.

The various examples described herein support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

The various examples described herein provide an iMTS antenna structure that provides phase shifting without the active elements required to change the phase, or in the traditional ways. The iMTS antenna structures of various examples use the characteristics of the metamaterial shape and configuration to provide phase shifts without the use of mechanical or electrical phase shifters.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance.

The iMTS radar system 100 of FIG. 1 may implement the various aspects, configurations, processes and modules described throughout this description. The iMTS radar system 100 is configured for placement in an autonomous driving system (e.g., autonomous driving system 1200 of FIG. 12) or in another structure in an environment (e.g., buildings, bill boards along roads, road signs, traffic lights, etc.) to complement and supplement information of individual vehicles, devices and so forth. The iMTS radar system scans the environment, and may incorporate infrastructure information and data, to alert drivers and vehicles as to conditions in their path or surrounding environment. The iMTS radar system is also able to identify objects and actions within the environment. Object identification is enhanced with the use of iMTS antennas with targeted polarization. The various examples described herein support autonomous driving with improved sensor performance, all-weather/all-condition detection, advanced decision-making algorithms and interaction with other sensors through sensor fusion. The iMTS radar system leverages intelligent metamaterial antenna structures and AI techniques to create a truly intelligent digital eye for autonomous vehicles.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An intelligent meta-structure antenna module for use in a radar for object identification, comprising:
   a first Intelligent Meta-Structure ("iMTS") antenna with a set of slots in a longitudinal direction for horizontal polarization and configured to detect a vehicle; and
   a second iMTS antenna with a set of slots in a transverse direction for vertical polarization and configured to detect a pedestrian.

2. The intelligent meta-structure antenna module of claim 1, wherein the set of slots in the transverse direction in the second iMTS antenna comprises alternating capacitive and inductive slots.

3. The intelligent meta-structure antenna module of claim 1, wherein the set of slots in the longitudinal direction in the first iMTS antenna comprises a set of capacitive slots.

4. The intelligent meta-structure antenna module of claim 1, wherein the first and second iMTS antennas comprise a set of dynamically controllable subarrays.

5. The intelligent meta-structure antenna module of claim 1, further comprising a transceiver coupled to the first and the second iMTS antennas.

6. The intelligent meta-structure antenna module of claim 1, wherein the first and second iMTS antennas are receive antennas.

7. The intelligent meta-structure antenna module of claim 1, further comprising at least one iMTS transmit antenna.

8. The intelligent meta-structure antenna module of claim 7, wherein the at least one iMTS transmit antenna transmits signals with a horizontal polarization, while the first and second iMTS antennas receive signals with a targeted polarization.

9. The intelligent meta-structure antenna module of claim 7, further comprising an antenna controller to direct the at least one iMTS transmit antenna to generate RF beams with a set of parameters.

10. The intelligent meta-structure antenna module of claim 9, wherein the set of parameters comprise a beam width and a transmit angle.

11. A method for identifying an object with an intelligent meta-structure radar in a surrounding environment, the method comprising:
   directing an Intelligent Meta-Structure ("iMTS") antenna structure to radiate RF beams with determined parameters with at least one iMTS transmit antenna;
   receiving reflections from the RF beams to generate radar data about the surrounding environment, the reflections received by a horizontally polarized iMTS antenna and a vertically polarized iMTS antenna;
   identifying an object in the surrounding environment from the radar data; and
   determining next actions for the iMTS antenna structure based on the identified object.

12. The method of claim 11, wherein the determined parameters comprise at least a beam width and a transmit angle.

13. The method of claim 11, wherein the determined parameters are determined based on an object identification prior to directing the iMTS antenna structure.

14. The method of claim 11, wherein receiving reflections from the RF beams to generate radar data comprises encoding the radar data into a point cloud.

15. The method of claim 14, wherein identifying an object comprises processing the point cloud in a convolutional neural network.

16. The method of claim 15, further comprising processing output data from the convolutional neural network in a decision network to determine an action for directing the iMTS antenna structure to radiate RF beams with determined parameters.

17. The method of claim 11, further comprising comparing a signal received by the horizontally polarized antenna with a signal received by the vertically polarized antenna and identifying the object based on the comparison.

18. An intelligent meta-structure radar system for use in a radar for object identification, comprising:
   an Intelligent Meta-Structure ("iMTS") antenna module comprising a set of iMTS transmit antennas and a set of iMTS receive antennas, the set of iMTS receive antennas comprising a horizontally polarized iMTS antenna and a vertically polarized iMTS antenna; and
   an iMTS perception module to identify an object based on radar data generated from reflections received by the set of iMTS receive antennas of signals transmitted by the set of iMTS transmit antennas.

19. The intelligent meta-structure radar system of claim 18, wherein the iMTS perception module comprises a polarization module to compare a polarization of a reflection received by the horizontally polarized iMTS antenna to a polarization of a reflection received by the vertically polarized iMTS antenna.

20. The intelligent meta-structure radar system of claim 19, wherein the iMTS perception module comprises a convolutional neural network to identify the object based on the comparison.

* * * * *